2,943,014

PROCESS FOR PREPARING SANITIZING COMPOSITIONS

Alfred C. Loonam, New York, N.Y., assignor to Chilean Nitrate Sales Corporation, New York, N.Y., a corporation of New York No Drawing. Filed Apr. 16, 1956, Ser. No. 578,190

5 Claims. (Cl. 167—14)

This invention relates to improved bactericidal compositions and more particularly to an improved process for producing solutions of iodine suitable, for example, for use as antiseptics and in sanitizing food-handling equipment and utensils.

It has been proposed heretofore to employ aqueous iodine solutions for sanitizing food handling equipment and the like, but the extensive commercial use of such solutions has been hampered somewhat by their relatively high cost of production and by the inherent corrosive action or tendency of iodine solutions to attack metals. The present invention contemplates the provision of an improved process for producing iodine solutions of the general class described, preferably from crude iodine as a starting material, by a procedure whereby the resulting product includes a corrosion inhibitor obtained basically as a result of the chemical reactions involved in converting the crude iodine to the desired form.

The invention is based in part on my discovery that crude iodine can be readily converted to iodide under commercially satisfactory process conditions by employing yellow elemental phosphorus as a reducing agent, the reaction proceeding as follows:

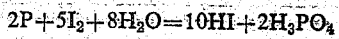

$$2P + 5I_2 + 8H_2O = 10HI + 2H_3PO_4$$

I have also found that phosphates are excellent corrosion inhibitors for iodine solutions, and that the use of yellow elemental phosphorus as a reducing agent for the crude iodine in the preparation of such solutions results in the production of a proportion of phosphoric acid in the solutions which, when suitably neutralized, is adequate to substantially inhibit corrosion by elemental iodine of metal food-handling equipment and the like when treated with the solutions.

While the use of phosphorus in reactions of this type has been proposed heretofore, such use has been restricted to red phosphorus because of the known tendency of yellow phosphorus to promote violent or uncontrollable reactions. On the other hand, red phosphorus is a relatively more expensive reagent than yellow phosphorus. I have discovered that crude iodine may be readily reduced with yellow phosphorus while maintaining excellent control of the reaction rate provided the reaction is carried out in an aqueous medium and the iodine is added at a controlled rate such that the temperature of the reaction mixture does not exceed about 55° C., or, at a rate otherwise controlled simply to avoid the presence of appreciable quantities of pure phosphorus and iodine in contact with each other at any time. Furthermore, while yellow phosphorus is relatively expensive as compared with other available reducing agents on an equivalent per weight basis, its use in the process of the present invention actually results in a considerable savings in cost by reason of its low atomic weight and the fact that in the reaction with iodine it undergoes a valence change of 5. Accordingly, one pound of yellow phosphorus will reduce 20 pounds of iodine to the iodide state.

Equally as important as the relative cost, however, is the fact that in the reaction as employed in accordance with the present invention, one mole of phosphoric acid is produced as a byproduct of the reaction for each mole of phosphorus employed, thereby providing a highly desirable additional constituent within the final solutions, in that, my investigations demonstrate that phosphates produced by partial neutralization of phosphoric acid are superior to any other inhibitor known for resisting corrosion of metals by iodine solutions of the general class described. Thus, being nontoxic, phosphoric acid is particularly suitable as a component for iodine solutions used to sanitize food handling utensils and equipment. Furthermore, the phosphoric acid being a weak acid, it serves to buffer the iodine solution, assuring that soaps and other alkaline materials with which the solutions come in contact during use will not render the solutions alkaline. In this connection, the pH of the solutions in use must be kept below 7.0 in order to prevent loss of available iodine by conversion to iodide and iodate.

It will be noted that the reduction of iodine with yellow phosphorus results in the formation of hydriodic acid (HI) which, because of its highly corrosive nature, is an undesirable constituent of the solutions. While the hydriodic acid could be neutralized with caustic soda, this is undesirable because of the necessity for maintaining a relatively low pH of the final product. In accordance with the process of the invention, I effectively neutralize the acid and am able to achieve important advantages by incorporating in the reaction mixture, after the iodine and phosphorus have reacted, a material which will react with the hydriodic acid to yield additional prosphoric acid and an iodide which is relatively less corrosive. In particular, I employ an alkali phosphate, preferably sodium phosphate, to react with the hydriodic acid, yielding sodium iodide and phosphoric acid. Advantageously, the primary or secondary sodium phosphates, or combinations thereof, can be used. The sodium phosphate is employed in stoichiometric proportions for reaction with the hydriodic acid, or in slight excess.

Depending upon the particular use to which the iodine solution is to be put, a pH lower than that which will normally be obtained in the reaction mixture may be desired. I prefer to adjust the pH of the solutions by the simple expedient of incorporating additional phosphoric acid therein. Similarly, it is desirable to maintain a relatively low freezing point and to limit vaporization of the solutions of the invention, and I may accomplish this by incorporating in the final solution a relatively small proportion of propylene glycol.

In carrying out reduction of the crude iodine by yellow phosphorus, I find it advantageous to limit the reaction temperature as hereinbefore explained and to maintain the limited temperature until all of the phosphorus has been consumed. Alternatively, I may rely on simple visual observation to insure control of the reaction, in that the reaction mixture is substantially colorless and one may readily detect any accumulation of solid iodine and phosphorus within the reaction vessel. I then heat the reaction mixture to a temperature not exceeding about 70° C. with the addition of a small amount of iodine to assure conversion of the lower oxidized forms of phosphorus to their highest valence state. The additional amount of iodine may be 1–5% of the weight of the stoichiometric quantity. The solution is then cooled to about 40° C., alkali phosphate is added to neutralize the HI, and additional iodine dissolved therein to give the desired proportion of titratable free iodine. The resulting solution thus comprises titratable free iodine, iodide and a proportion of partially neutralized phosphoric acid effective to buffer the solution against alkalinity and to inhibit corrosion of metals by the iodine during use of the solution in sanitizing metal utensils.

It is believed that the invention may be best understood by reference to the following specific examples of typical solutions prepared by the principles outlined above:

EXAMPLE I

Yellow phosphorus (stick form), in amount 2.7 grams (0.0872 mol), was covered with 1 liter of water at room temperature. The stoichiometric quantity of crude iodine, 55.3 grams, for reaction with the phosphorus to effect reduction of the iodine to iodide and oxidation of the phosphorus to phosphoric acid was added slowly while continually stirring the reaction mixture. When all of the phosphorus had been consumed and the addition of iodine was complete, the reaction mixture was heated to 70° C., and additional crude iodine added progressively until the color of free iodine persisted, the total additional iodine being 1.5 grams. This step insures complete conversion of any of the lower oxidized forms of phosphorus to its highest valence state as represented by phosphoric acid. The solution was then cooled to 40° C. and 40 grams additional iodine was dissolved therein to provide a stock solution containing by weight about 3.6 to 4% free, titratable iodine, 5 to 5.5% iodide ion, and 0.8 to 0.9% phosphoric acid.

While this solution is directly usable as a sanitizing agent, as was explained hereinbefore, it may be diluted and/or modified for particular applications by the addition of various reagents, such, for example, as wetting agents, humectants or suitable reagents for converting the hydriodic acid content to a less corrosive form. The following formulations are typical of many which may be prepared from the "stock" iodine solution obtained above:

Formulation I

Sodium dihydrogen phosphate, in amount of 25 grams, and 36 grams of propylene glycol were dissolved in 500 milliliters of the stock solution and thereafter the solution was diluted to 1.0 liter with water. Ten milliliters of this formulation in 1 gallon of water yields approximately 50 parts per million of free iodine and a solution pH of about 4.1.

The formulation was found to have the following composition:

| Constituents | Concentration, Grams Per Liter |
|---|---|
| Free iodine | 19.4 |
| Iodide ion | 26.3 |
| Phosphoric acid | 25.3 |
| Propylene glycol | 36.3 |

Formulation II

Phosphoric acid (85% conc.), in amount of 152 grams, 26.0 grams of sodium dihydrogen phosphate, and 36.0 grams of propylene glycol were admixed in 500 milliliters of the stock solution and thereafter diluted to 1.0 liter with water. Ten milliliters of this formulation in 1 gallon of water yields approximately 50 parts per million of free iodine and a solution pH of about 2.7.

The formulation was found to have the following composition:

| Constituents | Concentration, Grams Per Liter |
|---|---|
| Free iodine | 19.4 |
| Iodide ion | 26.3 |
| Phosphoric acid | 155.3 |
| Propylene glycol | 36.0 |

The bactericidal efficiency of several phosphoric acid iodide-iodine solutions prepared in accordance with the principles of the invention were tested in comparison with several commercially available so-called iodophors (iodo=iodine and phor=carrier), and other preparations of free iodine, against the microorganisms *Salmonella typhosa* and *Micrococcus pyogenes* var. *aureus* by test procedures recommended by the U.S. Department of Agriculture ("The Manual of the A.O.A.C.," 1955, 8th ed., "Available Chlorine Germicidal Equivalent Concentration (—)—First Action"; also Ind. and Eng. Chem. 1953, 45, 1013—1015). Sodium hypochlorite solutions were employed in the tests as chlorine controls. The various preparations included within these tests are identifiable as follows:

| Designation | Nature of Preparation |
|---|---|
| A | Iodine Tincture U.S.P. (2 percent free iodine). |
| B | Iodine Solution N.F. (2 percent free iodine). |
| C | Iodophor (1.75 percent free iodine). |
| D | Iodophor (1.25 percent free iodine). |
| E | Phosphoric acid buffered iodine-iodide solution prepared by the process of the invention (1.94 percent free iodine). |
| F | Phosphoric acid buffered iodine-iodide solution prepared by the process of the invention (1.64 percent free iodine). |
| G | Sodium Hypochlorite Control Solution (5.76 percent available chlorine) diluted with phosphate buffer (pH 8.0). |
| H | Sodium Hypochlorite Control Solution (5.76 percent available chlorine diluted with distilled water). |

The test procedure involved capacity testing of the solutions for germicidal action to determine the maximum number of incrementally added microorganisms plus rigidly defined extraneous matter in solution or suspension, sterilizable by a given quantity of the germicides. In the tests, 0.05 milliliter of the test bacteria was added to 10 milliliter dilutions of a sanitizing solution (a ratio of 1 to 200) to be tested. One minute later, a 4 millimeter standard loopful of the bacteria-germicide mixture was transplanted to a sterile tube containing 10 milliliters broth. Thirty seconds later, another increment of the bacteria was added, and a minute later another 4 millimeter loopful was transplanted. This was repeated until ten (10) increments had been added and ten (10) loopfuls of the mixture transplanted. The transplants were then incubated at 37° C. for 48 hours and the absence or presence of growth was noted macroscopically.

The results of the tests are represented in tabulated form in the following table, wherein the numerical values designate the number of increments of test bacteria completely killed. Thus, with reference to the table, it will be seen that 20 p.p.m. free iodine in the phosphoric acid iodide-iodine solutions and in the iodophor solutions at 20° C. killed through and including the tenth increment, whereas 50 p.p.m. free iodine at 20° C. were required for iodine solutions A and B to obtain similar results. Sodium hypochlorite solutions diluted with phosphate buffer to contain 200 p.p.m. chlorine were capable of killing at 20° C. up to and including only the seventh increment, and up to and including only the fourth increment when diluted with distilled water. The overall test results demonstrate that the solutions prepared by the process of the invention, designated E and F, possess germicidal efficiencies equal to those of the commercial iodophor solutions, C and D, and that they are considerably better than the standard iodine solutions, A and B, and far better than the hypochlorite solutions G and H. The results of even more drastic tests also demonstrating the high germicidal efficiencies of sanitizing solutions prepared by the process of the invention, may be seen by reference to the report entitled, "Iodine Sanitizing Solutions" by Louis Gershenfeld and Bernard Witlin, appearing in "Soap and Chemical Specialties," 31, 189 (Dec. 1955).

TABLE

*Germicidal capacity tests*

[10 ml. germicide+0.05 ml. inoculum]

| Bacteria | Temp., °C. | p.p.m. | A | B | C | D | E | F | G | H |
|---|---|---|---|---|---|---|---|---|---|---|
| S. Typhosa | 20 | 2 | 1 | 1 | 2 | 2 | 2 | 2 | 0 | 0 |
| | | 4 | 1 | 1 | 4 | 4 | 4 | 4 | 0 | 0 |
| | | 6 | 1 | 1 | 5 | 5 | 5 | 5 | 0 | 0 |
| | | 8 | 1 | 1 | 5 | 5 | 5 | 5 | 0 | 0 |
| | | 10 | 3 | 3 | 6 | 6 | 6 | 6 | 0 | 0 |
| | | 20 | 4 | 4 | 10 | 10 | 10 | 10 | 0 | 0 |
| | | 25 | 5 | 5 | 10 | 10 | 10 | 10 | 0 | 0 |
| | | 50 | 10 | 10 | 10 | 10 | 10 | 10 | 2 | 0 |
| | | 100 | 10 | 10 | 10 | 10 | 10 | 10 | 3 | 2 |
| | | 200 | 10 | 10 | 10 | 10 | 10 | 10 | 6 | 4 |
| | 37 | 2 | 1 | 1 | 2 | 2 | 2 | 2 | 0 | 0 |
| | | 4 | 1 | 1 | 4 | 4 | 4 | 4 | 0 | 0 |
| | | 6 | 1 | 1 | 5 | 5 | 5 | 5 | 0 | 0 |
| | | 8 | 1 | 1 | 5 | 5 | 5 | 5 | 0 | 0 |
| | | 10 | 3 | 3 | 6 | 6 | 6 | 6 | 0 | 0 |
| | | 20 | 4 | 4 | 10 | 10 | 10 | 10 | 0 | 0 |
| | | 25 | 5 | 5 | 10 | 10 | 10 | 10 | 0 | 0 |
| | | 50 | 10 | 10 | 10 | 10 | 10 | 10 | 3 | 1 |
| | | 100 | 10 | 10 | 10 | 10 | 10 | 10 | 4 | 3 |
| | | 200 | 10 | 10 | 10 | 10 | 10 | 10 | 7 | 6 |
| M. Pyogenes var. Aureus. | 37 | 2 | 0 | 0 | 1 | 1 | 1 | 1 | 0 | 0 |
| | | 4 | 0 | 0 | 1 | 1 | 1 | 1 | 0 | 0 |
| | | 6 | 0 | 0 | 1 | 1 | 1 | 1 | 0 | 0 |
| | | 8 | 0 | 0 | 3 | 3 | 3 | 3 | 0 | 0 |
| | | 10 | 1 | 1 | 6 | 6 | 6 | 6 | 0 | 0 |
| | | 20 | 2 | 2 | 10 | 10 | 10 | 10 | 0 | 0 |
| | | 25 | 3 | 3 | 10 | 10 | 10 | 10 | 0 | 0 |
| | | 50 | 5 | 5 | 10 | 10 | 10 | 10 | 2 | 0 |
| | | 100 | 10 | 10 | 10 | 10 | 10 | 10 | 3 | 2 |
| | | 200 | 10 | 10 | 10 | 10 | 10 | 10 | 5 | 4 |
| | 20 | 2 | 0 | 0 | 1 | 1 | 1 | 1 | 0 | 0 |
| | | 4 | 0 | 0 | 1 | 1 | 1 | 1 | 0 | 0 |
| | | 6 | 0 | 0 | 2 | 2 | 2 | 2 | 0 | 0 |
| | | 8 | 0 | 0 | 4 | 4 | 4 | 4 | 0 | 0 |
| | | 10 | 1 | 1 | 7 | 7 | 7 | 7 | 0 | 0 |
| | | 20 | 2 | 2 | 10 | 10 | 10 | 10 | 0 | 0 |
| | | 25 | 4 | 4 | 10 | 10 | 10 | 10 | 0 | 0 |
| | | 50 | 5 | 5 | 10 | 10 | 10 | 10 | 2 | 0 |
| | | 100 | 10 | 10 | 10 | 10 | 10 | 10 | 4 | 3 |
| | | 200 | 10 | 10 | 10 | 10 | 10 | 10 | 7 | 5 |

Having thus described the subject matter of this invention, what it is desired to secure by Letters Patent is:

1. The method for preparing bactericidal solutions suitable for sanitizing food-handling equipment and the like that comprises, reacting crude iodine with yellow elemental phosphorus in substantially stoichiometric proportions to effect reduction of the iodine to hydriodic acid and oxidation of the phosphorus to phosphoric acid, said reaction being effected by the controlled addition of the iodine to an aqueous reaction medium containing said phosphorus at a rate such that the temperature of the reaction mixture does not exceed about 55° C., and thereafter effecting neutralization of the resulting hydriodic acid by the addition to the reaction mixture of sodium phosphate in a substantially stoichiometric quantity for reaction with the hydriodic acid to yield additional phosphoric acid and sodium iodide.

2. The method for preparing bactericidal solutions suitable for sanitizing food-handling equipment and the like that comprises, reacting crude iodine with yellow elemental phosphorus in substantially stoichiometric proportions to effect reduction of the iodine to hydriodic acid and oxidation of the phosphorus to phosphoric acid, said reaction being effected by the controlled addition of the iodine to an aqueous reaction medium containing said phosphorus at a rate such that the temperature of the reaction mixture does not exceed about 55° C., dissolving additional iodine within the resulting solution to provide a desired proportion of titratable free iodine therein, thereafter adding sodium phosphate to said reaction mixture in a substantially stoichiometric quantity for reaction with the hydriodic acid to yield additional phosphoric acid and sodium iodide, and recovering a final solution containing titratable free iodine, sodium iodide and partially neutralized phosphoric acid in an amount sufficient to buffer the solution and to inhibit corrosion of metals by the iodine when said solution is employed for sanitizing purposes.

3. The method as claimed in claim 1, wherein the sodium phosphate is primary sodium phosphate.

4. The method as claimed in claim 1, wherein the sodium phosphate is secondary sodium phosphate.

5. The method for preparing bactericidal solutions suitable for sanitizing food-handling equipment and the like that comprises, reacting crude iodine and yellow elemental phosphorus in substantially stoichiometric proportions to effect reduction of the iodine to hydriodic acid and oxidation of the phosphorus to phosphoric acid, said reaction being effected by the controlled addition of the phosphorus to an aqueous reaction medium containing said iodine at a rate such that the temperature of the reaction mixture does not exceed about 55° C., dissolving additional iodine within the resulting solution to provide a desired proportion of titratable free iodine therein, thereafter adding sodium phosphate to said reaction mixture in a substantially stoichiometric quantity for reaction with the hydriodic acid to yield additional phosphoric acid and sodium iodide, and recovering a final solution containing titratable free iodine, sodium iodide and partially neutralized phosphoric acid in an amount sufficient to buffer the solution and to inhibit corrosion of metals by the iodine when said solution is employed for sanitizing purposes.

References Cited in the file of this patent

C. A. Jacobson: Encycl. of Chem. Reactions, Reinhold Press, 1948, p. 699.

Mellor: Comprehensive Treatise on Inorg. and Theoretical Chem., Longman, Green and Co., vol. II, L922, pp. 171 and 596.